United States Patent Office 3,029,237
Patented Apr. 10, 1962

3,029,237
QUINOXOLINYL THIOPHOSPHORIC ACID ESTERS
Klaus Sasse, Koln-Stammheim, Richard Wegler, Leverkusen, and Günter Unterstenhöfer, Opladen, Germany, assignors to Farbenfabriken Bayer Aktiengesellschaft, Leverkusen, Germany, a corporation of Germany
No Drawing. Filed July 6, 1960, Ser. No. 41,039
Claims priority, application Germany July 9, 1959
6 Claims. (Cl. 260—250)

The present invention relates to and has as its objects new and useful insecticidal thiophosphoric acid esters and methods of their preparations. Generally these new compounds may be represented by the following formula

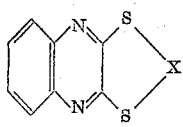

in which X stands for two

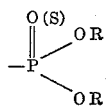

groups or one

group, R being an ester radical of the phosphoric or thiophosphoric acid. In the above formula furthermore the benzene nucleus may carry other substituents. More particularly the compounds of the present invention correspond to one of the following formulas:

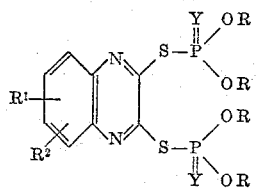

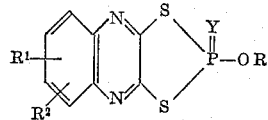

in which Y stands for oxygen or sulfur, R stands for a lower alkyl radical having up to 4 carbon atoms and $R^1$ and $R^2$ stand for members of the group consisting of hydrogen, lower alkyl, lower alkoxy, halogen, nitro and trifluoro methyl groups.

From copending application Serial No. 823,825 there are known reaction products of 2,3-dimercapto-quinoxaline and its derivatives substituted in the benzene nucleus, with carboxylic acid halides, carbonic acid and thiocarbonic acid halides, ester halides and amido-amides, sulfonic acid and sulfenic acid halides and the like. The compounds possess good acaricidal properties.

In accordance with this invention it has now been found that 2,3-dimercapto-quinoxalines which may contain further substituents in the benzene nucleus can be reacted with phosphoric acid- or thiophosphoric acidester halides to give new compounds with outstanding insecticidal and acaricidal properties. In comparison with the already known above mentioned derivatives of the mercapto quinoxalines the products according to the process are distinguished by their wider activity against a large number of insects. In comparison with known thiophosphoric acid esters, the high activity against resistant spider mites is especially noteworthy.

The 2,3-dimercapto quinoxalines which can contain in the benzene nucleus the further substituents react with phosphoric and thiophosphoric acid diester-monohalides to bis-thiophosphoric acid esters of the Formula I:

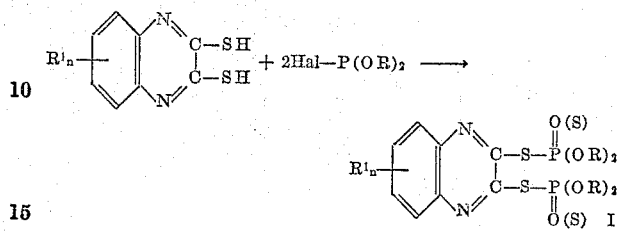

In these formulae more specifically R may be alkyl or aryl or both, $R^1$ stands for H, alkyl, O-alkyl, Hal, $NO_2$ and the like, and $n$ is a number from 1 to 4.

Effective cyclic thiophosphoric acid esters also result from the reaction of phosphoric acid or thiophosphoric acid mono ester dihalides upon 2,3-dimercapto quinoxalines:

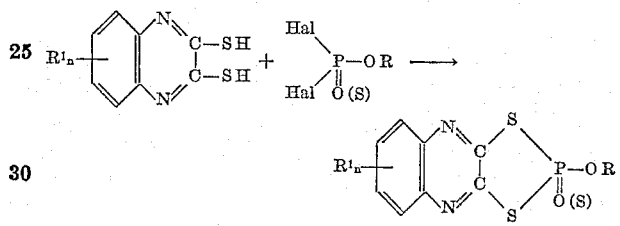

(the meaning of R, $R^1$ and $n$ is the same as in Formula I).

The above reactions are carried out according to methods known as such, e.g. by reacting phosphoric and thiophosphoric acid ester halides with the free mercapto quinoxalines in the presence of acid binding agents such as alkali metal and alkaline earth metal oxides, hydroxides or carbonates, tertiary amines or the like or with metal salts especially the alkali metal or ammonium salts of the mercapto quinoxalines.

The new compounds of the present invention very effectively kill insects like flies, mites, aphids, etc. They distinguish themselves especially by a good contact-insecticidal activity and at the same time by an activity on eating insects such as caterpillars. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may be used in combination with each other or with known insecticides, fertilizers etc.

As an example for the special utility of the inventive compounds the ester of the following formula

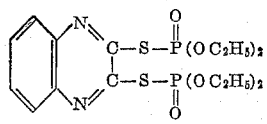

has been tested against aphids, flies and spider mites. Aqueous solutions of the aforementioned compound have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The tests have been carried out as follows:

(a) Against aphids of the type *Doralis fabae*: Heavily infested bean plants (*Vicia faba*) have been sprayed drip wet with solutions as prepared above. The effect has been determined after 24 hours by counting the dead pests either on the surface of the soil or still remaining on the plants. The aphids were killed completely with 0.01% solutions.

(b) Against flies (*Musca domestica*): About 50 flies are placed under covered Petri dishes in which drip wet filter paper has been placed which is sprayed with an insecticidal solution of a concentration of 0.01%. The living status of the flies has been determined after 24 hours. Complete killing has been obtained.

(c) Against spider mites: Bean plants (*Phaseolus vulgaris*) of about 15 inches height are sprayed drip wet with solutions prepared as indicated above. The bean plants have been infested heavily with the two-spotted spider (species *Tetranychus telarius*). Evaluation has been carried out after 24 hours, 48 hours and 8 days. Thereby complete killing has been obtained with 0.01% solutions.

The practical production of the products according to the invention and their importance as pesticidal agents are illustrated by the following examples.

*Example 1*

In a suspension of 23.8 grams of dry disodium salt of 2,3-dimercapto quinoxaline in 150 ml. of dioxane there are added dropwise with stirring at room temperature 34.5 grams of phosphoric acid diethyl ester chloride. Upon the end of the self-heating the mixture is briefly warmed to 80° C. The reaction product is filtered off and the filtrate evaporated under reduced pressure. The residue is taken up in alcohol, the resulting solution filtered and again evaporated. 21.5 grams of a compound of the formula

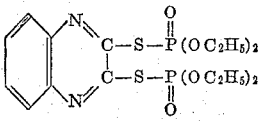

remain in the form of a pale brown oil.

*Example 2*

19.4 grams of 2,3-dimercapto-quinoxaline are dissolved in 150 ml. of dimethyl formamide. The solution is treated with 25.4 grams of dimethyl cyclohexyl amine. Thereafter while cooling and stirring there are added at a temperature of below 20° C. 40.9 grams of O,O-diethyl thionophosphoric acid chloride. Stirring is continued for 1 further hour at room temperature, and another hour at 35–40° C. Solids are removed by filtration with suction and the clear filtrate is distilled off under reduced pressure in vacuum at 65° C. The residue is taken up in benzene, washed twice with water very quickly, whereafter the benzenic layer immediately is dried over anhydrous sodium sulfate. After distilling off the benzene under reduced pressure there are obtained 25 grams of a brownish non-distillable oil which shows the following analytical data:

Calculated: N, 5.62%; P, 12.45%
Found: N, 5.25%; P, 12.25% which correspond to the following formula

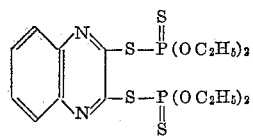

With 0.01% concentrations the compound kills flies, aphids and spider mites completely.

In a strictly analogous manner starting from nuclear substituted 2,3-dimercapto-quinoxalines there are obtained with O,O-diethyl-thionophosphoric acid chlorides the following compounds:

From 6-methyl-2,3-dimercapto-quinoxaline the compound of the following formula

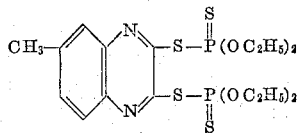

From 6-chloro-2,3-dimercapto-quinoxaline the compound of the following formula

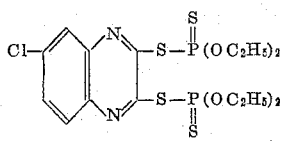

From 6-methoxy-2,3-dimercaptoquinoxaline the compound of the following formula

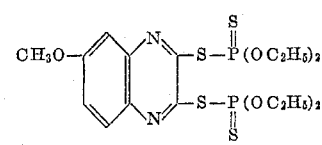

From 6-nitro-2,3-dimercapto-quinoxaline the compound of the following formula

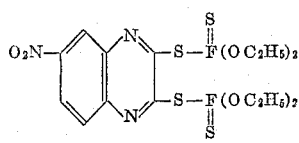

From 6-trifluoromethyl-2,3-dimercapto-quinoxaline the compound of the following formula

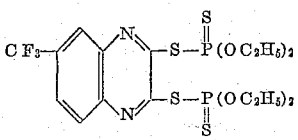

*Example 3*

To a solution of 19.4 grams of 2,3-dimercapto-quinoxaline in 150 ml. of dimethyl formamide there are added 25.4 grams of dimethyl cyclohexyl amine. While stirring and cooling to 20° C. there are added 32.1 grams of O,O-dimethyl-thionophosphoric acid chloride. Stirring is continued for 1 further hour at room temperature, thereafter at 35–40° C. for an additional hour. After filtration with suction the filtrate is concentrated in vacuum at a temperature of 65° C. The residue is taken up in benzene and filtered off again. Thereafter the solvent is distilled off in a slight vacuum below 65° C., whereafter in a high vacuum some minor amounts of impurities are removed. The remaining oil according to the following analytical data Calculated: N, 6.33%; P, 14.02%
Found: N, 6.21%; P, 13.73% corresponds to the following formula

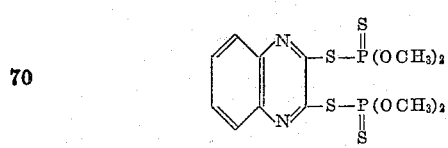

In a strictly analogous manner starting from 6,7-dimethyl-2,3-dimercapto-quinoxaline and thionophosphoric acid-O,O-dimethyl ester chloride there is obtained the compound of the following formula

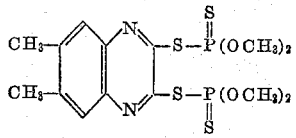

and from 6,7-dichloro-2,3-dimercapto-quinoxaline the compound of the following formula

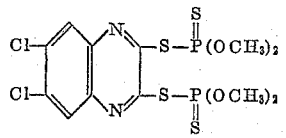

*Example 4*

If in a manner as described in the foregoing example 19.4 grams of 2,3-dimercapto-quinoxaline are reacted with 17.9 grams of O-ethyl thionophosphoric acid dichloride in the presence of 2-mols of a tertiary amine there is obtained the following compound

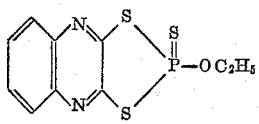

as a brownish oil.

By the same way as described above the compounds of the following formulae may be obtained with the corresponding equimolecular amount of O-ethyl-phosphoric acid ester dichloride:

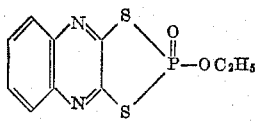

In an analogous manner the following compounds may be obtained either with corresponding equimolecular amounts of O-ethyl-thionophosphoric acid chloride or O-ethyl phosphoric acid chloride, if substituted 2,3-dimercapto-quinoxalines are used:

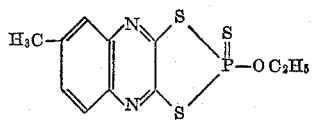

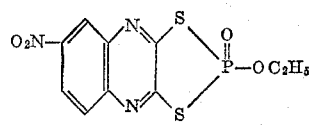

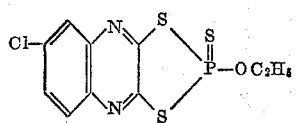

We claim:
1. The compound of the following formula

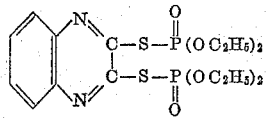

2. The compound of the following formula

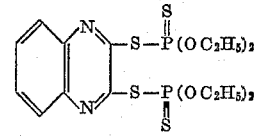

3. The compound of the following formula

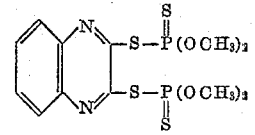

4. The compound of the following formula

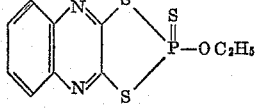

5. A thiophosphoric acid ester of the following formula

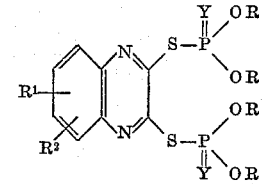

in which Y stands for member selected from the group consisting of O and S, R stands for a lower alkyl radical up to 4 carbon atoms, and $R^1$ and $R^2$ stand for members selected from the group consisting of hydrogen, lower alkyl, lower alkoxy, halogen, nitro and trifluoro methyl groups.

6. A thiophosphoric acid ester of the following formula

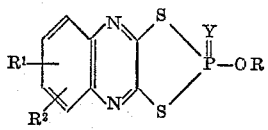

in which Y stands for member selected from the group consisting of O and S, R stands for a lower alkyl radical up to 4 carbon atoms, and $R^1$ and $R^2$ stand for members selected from the group consisting of hydrogen, lower alkyl, lower alkoxy, halogen, nitro and trifluoro methyl groups.

References Cited in the file of this patent
UNITED STATES PATENTS
2,919,985    Dersch _____ Jan. 5, 1960